United States Patent
Wu (10) Patent No.: US 10,833,887 B2
(45) Date of Patent: Nov. 10, 2020

(54) TERMINAL-BASED CONTROL METHOD FOR SMART HOUSEHOLD APPLIANCE AND TERMINAL

(71) Applicant: GREE ELECTRIC APPLIANCES, INC. OF ZHUHAI, Zhuhai (CN)

(72) Inventor: Yili Wu, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 0 days.

(21) Appl. No.: 16/335,251

(22) PCT Filed: Oct. 11, 2017

(86) PCT No.: PCT/CN2017/105737
§ 371 (c)(1),
(2) Date: Mar. 21, 2019

(87) PCT Pub. No.: WO2018/072631
PCT Pub. Date: Apr. 26, 2018

(65) Prior Publication Data
US 2020/0021456 A1 Jan. 16, 2020

(30) Foreign Application Priority Data
Oct. 17, 2016 (CN) .......................... 2016 1 0906244

(51) Int. Cl.
*G06F 15/16* (2006.01)
*H04L 12/28* (2006.01)
(Continued)

(52) U.S. Cl.
CPC .......... *H04L 12/2818* (2013.01); *G06F 3/048* (2013.01); *H04L 12/22* (2013.01);
(Continued)

(58) Field of Classification Search
CPC ........ G06F 3/167; G06F 3/041; G06F 3/0412; G06F 3/048; G06F 3/0482; G06F 3/0488;
(Continued)

(56) References Cited

U.S. PATENT DOCUMENTS 7,526,539 B1 * 4/2009 Hsu ..................... H04L 12/2818
709/203
8,255,090 B2 * 8/2012 Frader-Thompson ......................
G01R 21/00
700/295
(Continued)

FOREIGN PATENT DOCUMENTS

| CN | 102541547 A | 7/2012 |
| CN | 102938818 A | 2/2013 |

(Continued)

*Primary Examiner* — Melvin H Pollack
(74) *Attorney, Agent, or Firm* — Kilpatrick Townsend & Stockton, LLP (57) ABSTRACT

The present disclosure provides a terminal-based control method for a smart household appliance and a terminal, and relates to a field of controlling a smart device. The terminal-based control method for a smart household appliance of the present disclosure comprises: determining a working state of each smart household appliance; when it is determined that at least one smart household appliance is in a power-on state through the terminal, opening a second-level control interface of at least one smart household appliance in the power-on state; the second-level control interface is configured to adjust working parameters of the smart household appliance. Through the second-level control interface, the working parameters of the smart household appliance may be adjusted directly, thereby realizing and improving convenience of controlling the smart household appliance.

20 Claims, 6 Drawing Sheets (51) Int. Cl.
*G06F 3/048* (2013.01)
*H04L 12/22* (2006.01)
*H04L 12/24* (2006.01)

(52) U.S. Cl.
CPC .......... *H04L 12/2823* (2013.01); *H04L 41/12* (2013.01); *H04L 2012/2849* (2013.01)

(58) Field of Classification Search
CPC ........ G06F 3/12; G06F 3/1206; G06F 3/1226; G06F 3/1247; G06F 3/126; G06F 3/1285; G06F 3/1292; G06F 3/14; G06F 15/16; G06Q 20/3224; G06Q 20/3226; G06Q 20/327; G06Q 20/3278; G06Q 20/4012; G06Q 20/40145; G06Q 20/405; G06Q 2220/00; H04L 12/2805; H04L 41/0803; H04L 12/2809; H04L 12/2838; H04L 2012/2841; H04L 2012/2849; H04L 2012/285; H04M 1/2478; H04W 4/12; H04W 64/003; H04W 88/02; H04W 76/10
USPC .......................................... 709/204
See application file for complete search history.

(56) References Cited

U.S. PATENT DOCUMENTS

| | | | | |
|---|---|---|---|---|
| 8,504,007 B2* | 8/2013 | Wesby | .............. | H04W 12/0023 455/419 |
| 8,909,779 B2* | 12/2014 | Clair | ..................... | H04L 41/069 709/225 |
| 9,000,896 B1* | 4/2015 | Kim | ........................ | H04L 47/41 340/10.5 |
| 9,026,141 B2* | 5/2015 | de Clercq | .............. | G05B 15/02 455/456.1 |
| 9,131,272 B2* | 9/2015 | Arling | ................. | H04L 12/2805 |
| 9,197,437 B2* | 11/2015 | Kim | .................. | H04L 12/2829 |
| 9,378,601 B2* | 6/2016 | Ricci | ................. | H04W 12/0804 |
| 9,513,744 B2* | 12/2016 | Pryor | ..................... | G01C 21/3664 |
| 9,691,272 B2* | 6/2017 | Hou | ...................... | H04L 67/125 |
| 9,706,031 B2* | 7/2017 | Nagata | ............... | H04M 1/72577 |
| 9,733,828 B2* | 8/2017 | Ji | ....................... | G06F 3/04886 |
| 9,772,738 B2* | 9/2017 | Na | ....................... | G06F 3/04883 |
| 9,829,541 B2* | 11/2017 | Li | ...................... | G01R 31/3648 |
| 9,929,851 B2* | 3/2018 | Zhou | ........................ | H04L 5/003 |
| 9,954,989 B2* | 4/2018 | Zhou | .................... | H04M 1/72522 |
| 10,015,060 B2* | 7/2018 | Yamada | ................. | H04L 41/22 |
| 10,063,625 B2* | 8/2018 | Arling | .................. | H04L 67/10 |
| 10,075,334 B1* | 9/2018 | Kozura | ............. | H04W 12/0806 |
| 10,091,197 B2* | 10/2018 | Rhoads | ................... | H04W 4/80 |
| 10,120,420 B2* | 11/2018 | Bathiche | ............... | G06F 1/1632 |
| 10,120,428 B2* | 11/2018 | Kim | .......................... | G06F 1/28 |
| 10,129,044 B2* | 11/2018 | Kangshang | ............ | G05B 15/02 |
| 10,333,731 B2* | 6/2019 | Ebrom | ................ | G06F 9/44505 |
| 10,382,531 B2* | 8/2019 | Hall | ........................ | H04L 67/42 |
| 10,397,013 B1* | 8/2019 | Hill | ....................... | H04L 67/306 |
| 10,402,037 B1* | 9/2019 | Van Gorkom | ..... | G06Q 30/0267 |
| 10,443,879 B2* | 10/2019 | Fadell | ....................... | F24F 11/62 |
| 10,499,146 B2* | 12/2019 | Lang | .................... | H04L 12/2809 |
| 10,564,813 B2* | 2/2020 | Shim | ................... | H04L 12/2816 |
| 10,616,075 B2* | 4/2020 | Dawes | ................ | H04L 67/125 |
| 10,635,371 B2* | 4/2020 | Hyun | ........................ | G06F 3/14 |
| 10,664,010 B2* | 5/2020 | Chung | .................. | G06F 1/1626 |
| 10,691,327 B2* | 6/2020 | Park | ....................... | H04L 43/16 |
| 10,754,542 B2* | 8/2020 | Bauer | .................. | H04M 1/72522 |
| 10,757,552 B2* | 8/2020 | Gross | ................. | H04M 1/72522 |
| 2014/0129006 A1* | 5/2014 | Chen | ..................... | G05B 15/02 700/90 |
| 2014/0143784 A1* | 5/2014 | Mistry | .................. | G06F 3/0482 718/102 |
| 2015/0095786 A1 | 4/2015 | Kreiner et al. | | |
| 2015/0372539 A1* | 12/2015 | Livadaras | .............. | G06Q 50/06 700/297 |
| 2016/0085385 A1* | 3/2016 | Gao | ....................... | G06F 3/0488 715/814 |
| 2016/0234036 A1* | 8/2016 | Hatambeiki | ........ | H04L 12/6418 |
| 2016/0245538 A1* | 8/2016 | Amer | ..................... | H04L 67/125 |
| 2016/0373909 A1* | 12/2016 | Rasmussen | ............. | H04W 4/60 |
| 2017/0045866 A1* | 2/2017 | Hou | ................... | H04L 12/2825 |
| 2017/0214540 A1* | 7/2017 | Wang | ..................... | H04M 11/00 |
| 2017/0322722 A1* | 11/2017 | Irvine | ................... | G06F 3/0414 |
| 2018/0212826 A1* | 7/2018 | Klausen | ................. | H04L 69/18 |
| 2018/0284735 A1* | 10/2018 | Cella | .................. | G05B 23/0221 |
| 2018/0321651 A1* | 11/2018 | Blanchard | ................ | F24F 11/64 |
| 2019/0052476 A1* | 2/2019 | Shu | ........................ | H04W 4/80 |
| 2019/0361694 A1* | 11/2019 | Gordon | .................. | G06F 1/169 |
| 2020/0125224 A1* | 4/2020 | Shim | ..................... | G06F 3/0346 |
| 2020/0249895 A1* | 8/2020 | Hyun | ..................... | G06F 3/0484 |

FOREIGN PATENT DOCUMENTS

| | | |
|---|---|---|
| CN | 103607331 A | 2/2014 |
| CN | 103685522 A | 3/2014 |
| CN | 104062921 A | 9/2014 |
| CN | 104503688 A | 4/2015 |
| CN | 104749978 A | 7/2015 |
| CN | 104914730 A | 9/2015 |
| CN | 104915094 A | 9/2015 |
| CN | 105116734 A | 12/2015 |
| CN | 106656689 A | 5/2017 |

* cited by examiner

TERMINAL-BASED CONTROL METHOD FOR SMART HOUSEHOLD APPLIANCE AND TERMINAL

The present disclosure is a national phase application of International Application No. PCT/CN2017/105737, filed on Oct. 11, 2017, which claims priority to the Chinese Patent Application No. 201610906244.5, entitled "Terminal-Based Control Method for Smart Household Appliance and Terminal" and filed on Oct. 17, 2016, and claims the priority of Chinese Patent Application, the disclosure of which is incorporated herein by reference in its entirety.

TECHNICAL FIELD

The present disclosure relates to the field controlling a smart device, and more specifically, to a terminal-based control method for a smart household appliance and a terminal.

BACKGROUND

With the development of information, smart household appliances have also flourished, and people are getting more and more reliant on the smart household appliances. In order to facilitate controlling smart household appliances for users, controlling the smart household appliances through a remote controller or a smart phone can be, but is not limited to the following ways: when all smart household appliances are controlled through a remote controller, multiple buttons need to be configured on the remote controller; however, when the user uses the remote controller, the user has to know which smart household appliance is triggered by each button and what function of the smart household appliance is triggered. The remote controller is complicated to use, and it's inconvenient for the user to operate, so it is easy to cause error operations.

It is common to control a smart household appliance through a smart mobile phone. Usually, the smart mobile phone is installed with a chip or an application for controlling the smart household appliance, the user can control the smart household appliance through the smart mobile phone. The corresponding operation method is as follows: lighting the mobile phone screen—unlocking—opening the application for controlling the smart household appliance—pairing and connecting the smart household appliance—controlling the smart household appliance. Wherein, the smart household appliance (smart household appliance information) which is successful paired and connected is displayed on the smart phone screen in the form of a list; after that, the user selects the smart household appliance to be controlled in the list. After the smart household appliance to be controlled is selected, a corresponding control interface appears to realize the control for the smart household appliance. Although the way of controlling a smart household appliance through a smart mobile phone in the prior art provides a new choice for the user to control the smart household appliance, the operation mode is too troublesome, and it is still necessary to further simplify the operation.

In summary, there is an urgent need for a method for controlling a smart household appliance through a smart mobile phone, so as to improve convenience of controlling the smart household appliance.

SUMMARY

The embodiments of the present disclosure provide a terminal-based control method for a smart household appliance and a terminal, so as to improve the convenience of controlling the smart household appliance.

A terminal-based control method for a smart household appliance provided by the embodiment of the present disclosure, comprising determining a working state of each smart household appliance; opening a second-level control interface of at least one smart household appliance which is in the power-on state through a terminal when it is determined that at least one multiple smart household appliance is in a power-on state; wherein, the second-level control interface is configured to adjust working parameters of the smart household appliance.

In an embodiment, opening the second-level control interface of at least one smart household appliance which is in the power-on state through the terminal comprises: determining a smart household appliance finally displayed through the terminal during controlling the smart household appliances last time when it is determined that multiple smart household appliances are in the power-on state; displaying a second-level control interface of the finally displayed smart household appliance on the terminal preferentially when the finally displayed smart household appliance is in the power-on state.

In an embodiment, the terminal-based control method for a smart household appliance further comprises: determining the smart household appliance in the power-on state to be displayed, according to a preset priority order of multiple smart household appliances, when it is determined that multiple smart household appliances are in the power-on state, and that the finally displayed smart household appliance is in a power-off state.

In an embodiment, the terminal-based control method for a smart household appliance further comprises: toggling and displaying second-level control interfaces of the multiple smart household appliances in the power-on state on a screen of the terminal according to a user's operation.

In an embodiment, the terminal-based control method for a smart household appliance further comprises: opening a first-level control interface of at least one smart household appliance through the terminal when it is determined that all smart household appliances are in a power-off state; wherein, the first-level control interface is configured to control the working state of the smart household appliance.

In an embodiment, opening the first-level control interface of at least one smart household appliance through the terminal comprises: determining a smart household appliance finally displayed through the terminal during controlling the smart household appliances last time; displaying the first-level control interface of the finally displayed smart household appliance preferentially.

In an embodiment, first-level control interfaces of multiple smart household appliances in the power-off state are toggled and displayed on a screen of the terminal according to a user's operation.

In an embodiment, in a screen-locked state, the terminal displays the second-level control interface.

In an embodiment, in a screen-locked state, the terminal displays the first-level control interface.

A terminal for controlling a smart household appliance provided by the embodiment of the present disclosure comprises: a determining unit, configured to determine determining a working state of each smart household appliance; a processing unit, configured to, when it is determined that at least one multiple smart household appliance is in a power-on state, open a second-level control interface of at least one smart household appliance which is in the power-on state through a terminal; wherein, the second-level control interface is configured to adjust working parameters of the smart household appliance.

In an embodiment, the determining unit is further configured to, when it is determined that multiple smart household appliances are in the power-on state, determine a smart household appliance finally displayed through the terminal during controlling the smart household appliances last time; the processing unit is configured to, when the finally displayed smart household appliance is in the power-on state, displaying a second-level control interface of the finally displayed smart household appliance on the terminal preferentially.

In an embodiment, the determining unit is further configured to, when it is determined that multiple smart household appliances are in the power-on state, and that the finally displayed smart household appliance is in a power-off state, determining the smart household appliance in the power-on state to be displayed, according to a preset priority order of multiple smart household appliances.

In an embodiment, the processing unit is further configured to toggle and display second-level control interfaces of the multiple smart household appliances in the power-on state on a screen of the terminal according to a user's operation.

In an embodiment, the processing unit is further configured to, when it is determined that all smart household appliances are in a power-off state, open a first-level control interface of at least one smart household appliance through the terminal; wherein, the first-level control interface is configured to control the working state of the smart household appliance.

In an embodiment, the determining unit is further configured to determine a smart household appliance finally displayed through the terminal during controlling the smart household appliances last time; the processing unit is further configured to display the first-level control interface of the finally displayed smart household appliance preferentially.

In an embodiment, the processing unit is further configured to toggle and display the first-level control interfaces of multiple smart household appliances in the power-off state on a screen of the terminal according to a user's operation.

In an embodiment, in a screen-locked state, the terminal displays the second-level control interface.

In an embodiment, in a screen-locked state, the terminal displays the first-level control interface.

A terminal for controlling a smart household appliance provided by the embodiment of the present disclosure comprises a memory, and a processor, which is coupled and connected to a memory, and configured to perform the method above based on instructions stored in the memory.

The embodiment of the present disclosure provided a computer readable storage medium, wherein, computer program instructions are stored in the computer readable storage medium; and when the instructions are executed by one or more processors, steps of the method above are performed.

The terminal of the embodiment of the present disclosure determines whether each smart household appliance is in the power-on state or in the power-off state first, and if at least one smart household appliance is in the power-on state, then the second-level control interface of at least one smart household appliance in the power-on state is opened through the terminal. Through the second-level control interface, the working parameters of the smart household appliance may be adjusted directly, thereby reducing manual selections of the user, and improving the convenience of controlling the smart household appliance.

DETAILED DESCRIPTION OF EMBODIMENTS

To make the objectives, technical solutions and beneficial effects of the present disclosure clearer, the present disclosure will be further described in detail hereafter with reference to the accompanying drawings and the embodiments. It should be understood that the specific embodiments described herein are only intended to explain the present disclosure, but not to limit the present disclosure.

A terminal of an embodiment of the present disclosure includes a UE (User Equipment), a PDA (Personal Digital Assistant), a handheld device with a wireless communication function, a computer, a smart phone, a mobile phone, a notebook computer, a tablet computer, etc.

Figure 1:
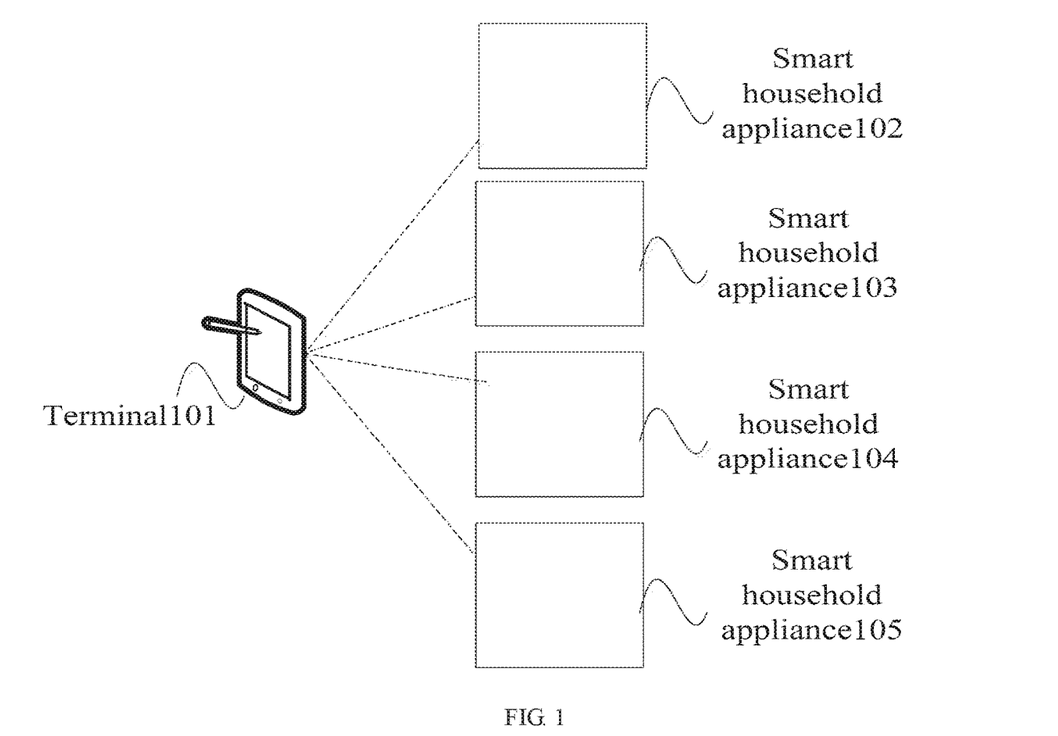
FIG. 1 is a schematic view of a system frame provided by an embodiment of the present disclosure.

FIG. 1 is a schematic view illustrating a system frame according to an embodiment of the present disclosure. As shown in FIG. 1, the system frame includes a terminal 101, multiple smart household appliances, such as a smart household appliance 102, a smart household appliance 103, a smart household appliance 104, a smart household appliance 105, etc.; wherein the smart household appliance may be a smart television, a smart air conditioner, a smart fan and other smart household appliances. The terminal and the smart household appliances may be paired and connected through Bluetooth or the same Wi-Fi (Wireless-Fidelity) network, etc.

Figure 2:
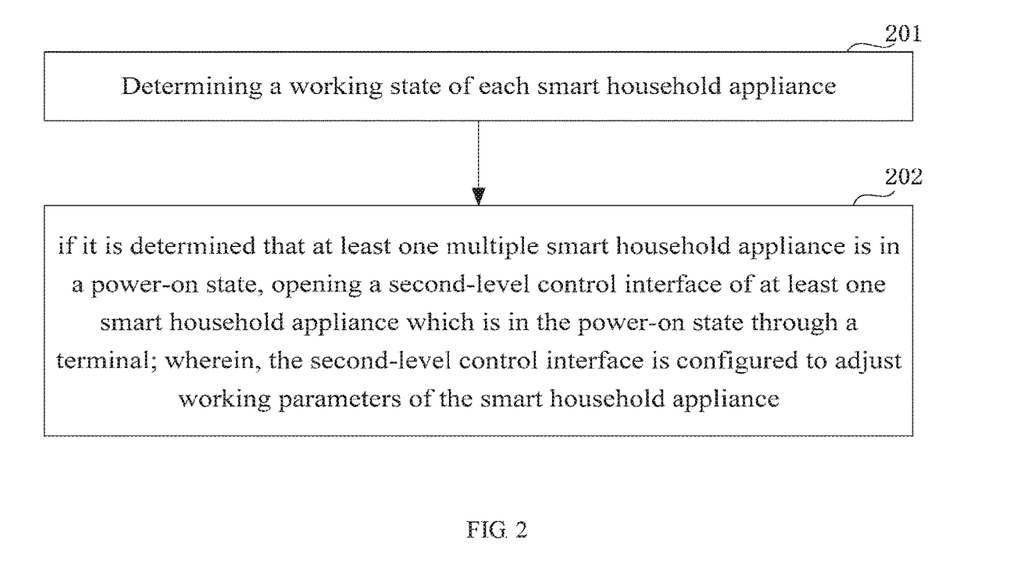
FIG. 2 is a flow chart of a terminal-based control method for a smart household appliance provided by an embodiment of the present disclosure.

Based on the system frame shown in FIG. 1, FIG. 2 illustrates a flow chart of a terminal-based control method for a smart household appliance according to an embodiment of the present disclosure. As shown in FIG. 2, the terminal-based control method for the smart household appliance comprises following steps:

step 201, determine a working state of each of multiple smart household appliances, wherein, the working states may include a power-on state or a power-off state;

step 202, open a second-level control interface of at least one smart household appliance which is in the power-on state through the terminal, if it is determined that at least one of the multiple smart household appliances is in the power-on state; wherein the second-level control interface of the smart household appliance is configured to adjust the working parameters of the smart household appliance.

The terminal of the embodiment of the present disclosure determines whether each smart household appliance is in the power-on state or in the power-off state first, and if at least one smart household appliance is in the power-on state, then the second-level control interface of at least one smart household appliance in the power-on state is opened through the terminal. Through the second-level control interface, the working parameters of the smart household appliance may be adjusted directly, thereby reducing manual selections of the user, and improving the convenience of controlling the smart household appliance.

For example, the terminal determines that five smart household appliances are in the power-on state, then the second-level control interfaces of five smart household appliances are opened through the terminal; the opened second-level control interfaces of five smart household appliances may be displayed through the terminal, or any one of the opened second-level control interfaces of five smart household appliance may be displayed through the terminal; or any two, three or more of the opened second-level control interfaces of five smart household appliances may be displayed through the terminal.

In an embodiment, prior to determining a state of the smart household appliance, the terminal and the smart household appliance need to be paired and connected for the first time, which includes but is not limited to the following ways: pairing and connecting through Bluetooth. The terminal and the smart household appliance are simultaneously connected to the same Wi-Fi network, then the terminal searches the smart household appliance connected to the same Wi-Fi network; after searching the smart household appliance connected to the same Wi-Fi network, the terminal sends a pairing and connecting request to the smart household appliance to be controlled; after receiving the pairing and connecting request sent by the terminal, the smart household appliance sends an identifying code of pairing and connecting to the terminal; after the terminal receives the identifying code sent by the smart household appliance, the terminal determines that the pairing and connecting is successful; the terminal scans a two-dimensional code carried by the smart household appliance itself for pairing and connecting. NFC (Near Field Communication) pairing and connecting, namely, after the terminal is approximate to an NFC module of the smart household appliance, the smart household appliance and the terminal send their own information to each other, so as to exchange information and fulfill pairing and connecting. After the terminal and smart household appliance is paired and connected successfully, the terminal acquires information of the smart household appliance, such as a model, a manufacturer, a state of the smart household appliance and parameters setting of the current state of the smart household appliance, etc. The terminal stores the acquired information of the smart household appliance, and if the terminal needs to control the smart household appliance once again, the terminal can quickly be paired and connected with the smart household appliance according to the information of the smart household appliance used in paring and connecting for the first time.

In an embodiment, opening a second-level control interface of at least one smart household appliance in the power-on state through the terminal comprises: opening a second-level control interface of at least one smart household appliance in the power-on state, if it is determined that multiple smart household appliances are in the power-on state; determining the smart household appliance which was finally displayed through the terminal during controlling the smart household appliances last time; if the finally displayed smart household appliance is in the power-on state, displaying the second-level control interface of the finally displayed smart household appliance on the screen of the terminal, so that the opened second-level control interface of at least one smart household appliance in the power-on state can be toggled by the user and displayed on the screen of the terminal. As the probability that the finally displayed smart household appliance continues to be operated is relative high, preferentially displaying the finally displayed smart household appliance can increase the hit rate for the smart household appliance that the user will operate next time, thereby improving the intelligent degree and user experience.

In an embodiment, when it is determined that multiple smart household appliances are in the power-off state, the step of opening a second-level control interface of at least one smart household appliance in the power-on state can be skipped, and directly perform the step of determining the second-level control interface of the smart household appliance to be displayed, thereby reducing a page jumping process, increasing the reaction speed of the appliance and reducing user's incorrect operations.

In an embodiment, if it is determined that the finally displayed smart household appliance is in the power-off state, display the second-level control interface of the smart household appliance, which has the highest priority order in the at least on smart household appliance in the power-on state, on the screen of the terminal according to the preset priority order of the plurality of smart household appliances, so that the opened second-level control interface of at least one smart household appliance in the power-on state can be toggled by the user and displayed on the screen of the terminal. In this way, the second-level control interfaces of the smart household appliances can be displayed in accordance with the priority order, which enables the display sequence of the second-level control interfaces to meet the usual requirements of the user, thereby reducing toggling operations of the user and improving user experience.

In an embodiment, multiple smart household appliances are provided. If multiple smart household appliances are in the power-on state, the terminal opens the second-level control interfaces of the multiple smart household appliances in the power-on state, and what displayed on the screen of the terminal is the second-level control interface of the smart household appliance finally displayed during controlling the smart household appliances last time, so that the opened second-level control interfaces of at least one smart household appliance in the power-on state can be toggled by the user and displayed on the screen of the terminal.

For example, it is assumed that the smart household appliances includes a smart air conditioner, a smart television, and a smart fan; if the smart air conditioner, the smart television, and the smart fan are all in the power-on state, then the terminal opens the second-level control interfaces of the smart air conditioner, the smart television and the smart fan; if the terminal determines that the last control operation for the smart household appliance prior to the current control operation for the smart household appliance is exited from the smart air conditioner, then what displayed on the screen of the terminal is the second-level control interface of the smart air conditioner; through an interface toggling slide icon, toggle and display the second-level control interface of the smart television and the second-level control interface of the smart fan. If the smart air conditioner is currently in the power-off state, while the smart television and the smart fan are in the power-on state, then the terminal opens the second-level control interfaces of the smart television and the smart fan according to the preset priority order of the smart television and the smart fan. Assuming that the priority order of the smart television is higher than the priority order of the smart fan, then what displayed on the screen of the terminal is the second-level control interface of the smart television, so that the opened second-level control interface of the smart fan in the power-on state to be toggled by the user and displayed on the screen of the terminal.

Figure 3:
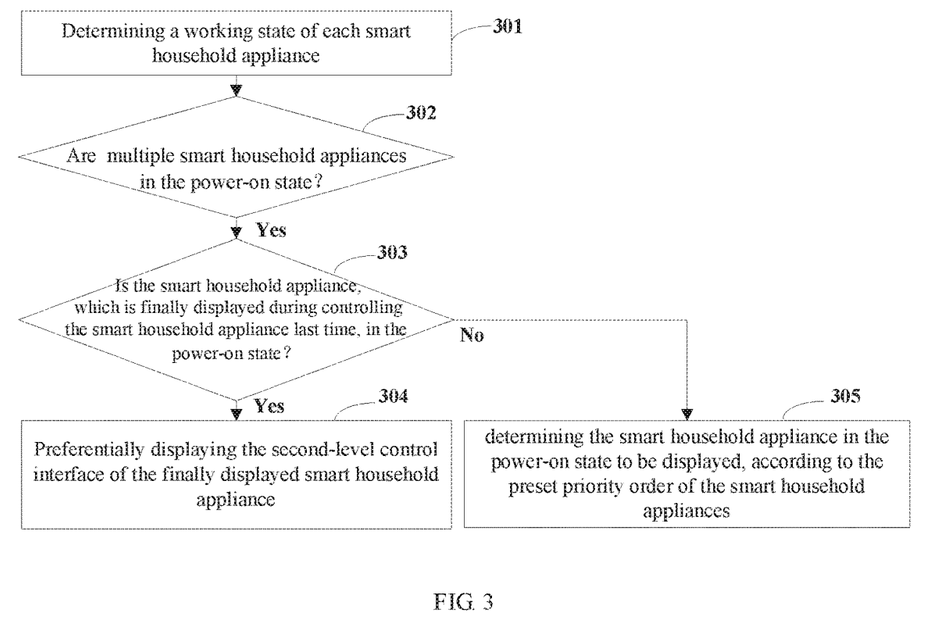
FIG. 3 is a flow chart of a terminal-based control method for a smart household appliance provided by another embodiment of the present disclosure.

In an embodiment, a terminal-based control method for a smart household appliance of the present invention is shown in FIG. 3:

Step 301, determine the working state of each of multiple smart household appliances.

Step 302, if it is determined that at least one smart household appliance is in the power-on state, judge whether there are multiple smart household appliances which are in the power-on state or not; if there are multiple smart household appliances which are in the power-on state, then perform step 303.

Step 303, determine the smart household appliance finally displayed through the terminal during controlling the smart household appliances last time, and judge whether the finally displayed smart household appliance is in the power-on state or not; if the finally displayed smart household appliance is in the power-on state, then perform step 304; if the finally displayed smart household appliance is in the power-off state, then perform step 305.

Step 304, preferentially display the second-level control interface of the finally displayed smart household appliance through the terminal.

Step 305, determine which smart household appliance in the power-on state will be displayed according to the preset priority order of the smart household appliances.

In this way, in the case that multiple smart household appliances are in the power-on state, the smart household appliance, finally displayed through the terminal during controlling the smart household appliances last time, is preferentially displayed, and the smart household appliances in the power-on state are displayed according to the preset priority order, thereby matching, as far as possible, the smart household appliances which the user wishes to operate, reducing the user's operations for selecting the smart household appliances, and improving operation efficiency and user friendliness.

Figure 4A:
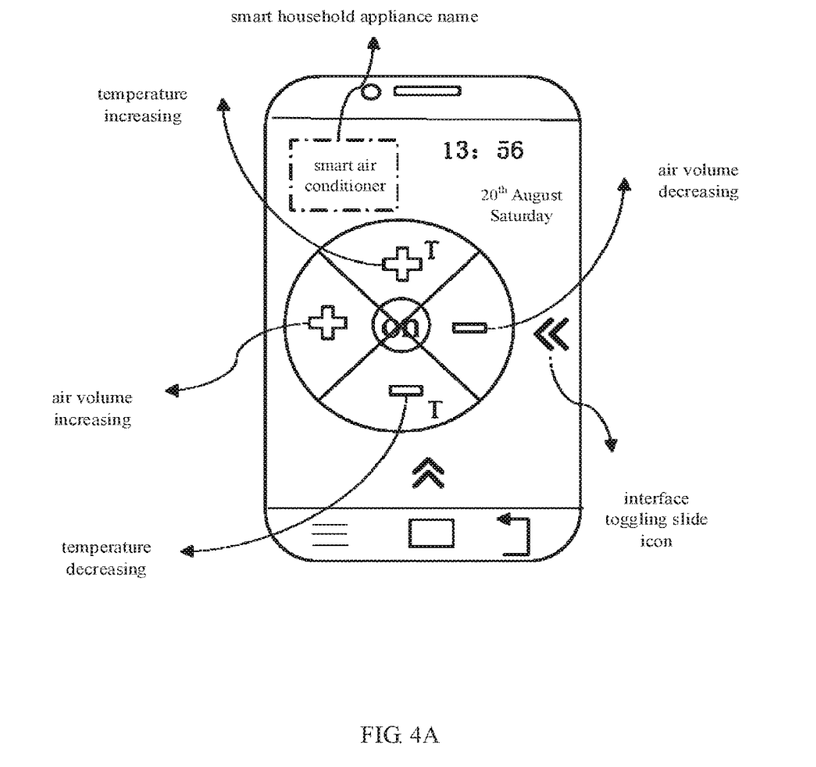
FIG. 4A is a view illustrating a terminal-based second-level control interface of the smart air conditioner provided by an embodiment of the present disclosure.
Figure 4B:
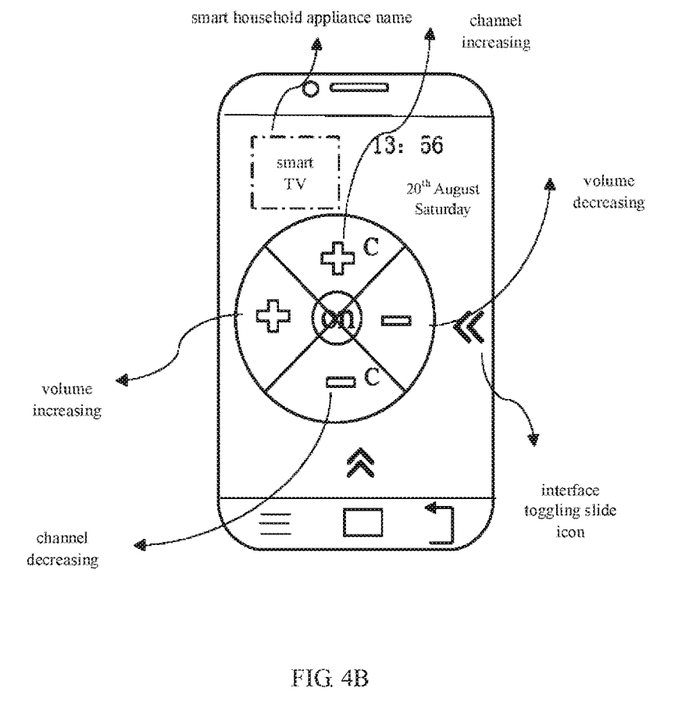
FIG. 4B is a view illustrating a terminal-based second-level control interface of a smart television provided by an embodiment of the present disclosure.

In an embodiment, preferably, the second-level control interface of the smart household appliance opened on the terminal is the same as the control panel of the special remote controller of the smart household appliance. In an embodiment, the second-level control interface of the smart household appliance opened on the terminal may also be an interface that retains common control options. FIG. 4A illustrates a terminal-based second-level control interface of the smart air conditioner provided by an embodiment of the present disclosure. As shown in FIG. 4A, the second-level control interface of the smart air conditioner retains common control options such as a smart household appliance name (smart air conditioner), temperature increasing and decreasing options, air volume increasing and decreasing options, an interface toggling slide icon option, a return option, a smart air conditioner turning off option, an upward and downward sliding option, etc. By sliding the interface toggling slide icon option on the second-level control interface of the smart air conditioner, the second-level control interfaces of other smart household appliances in the power-on state can be toggled and displayed on the screen of the terminal. The working parameters of the smart air conditioner are adjusted through the temperature increasing and decreasing options and the air volume increasing and decreasing options. FIG. 4B illustrates a terminal-based second-level control interface of a smart television provided by an embodiment of the present disclosure. As shown in FIG. 4B, the second-level control interface of the smart television retains common control options such as a smart household appliance name (smart television), channel increasing and decreasing options, volume increasing and decreasing options, an interface toggling slide icon option, a return option, a smart television turning off option, an upward and downward sliding option, etc. By sliding the interface toggling slide icon option on the second-level control interface of the smart television, the second-level control interfaces of other smart household appliances in the power-on state can be toggled and displayed on the screen of the terminal. The working parameters of the smart television are adjusted through the channel increasing and decreasing options and the volume increasing and decreasing options.

In an embodiment, if it is determined that only one smart household appliance is in the power-on state, then the second-level control interface of the smart household appliance in the power-on state is displayed on the screen of the terminal.

In an embodiment, if it is determined that all of the smart household appliances are in the power-off state, then first-level control interfaces, including the first-level control interfaces of one or more smart household appliances, are opened through the terminal; wherein, the first-level control interface of the smart household appliance is configured to control the smart household appliance to be in the power-on state or in the power-off state.

It should be noted that, prior to determining the state of the smart household appliance, the terminal and the smart household appliance need to be paired and connected for the first time, which includes but is not limited to the following ways: pairing and connecting through Bluetooth. The terminal and the smart household appliance are simultaneously connected to the same Wi-Fi network, then the terminal searches the smart household appliance connected to the same Wi-Fi network; after searching the smart household appliance connected to the same Wi-Fi network, the terminal sends a pairing and connecting request to the smart household appliance to be controlled; after receiving the pairing and connecting request sent by the terminal, the smart household appliance sends an identifying code of pairing and connecting to the terminal; after the terminal receives the identifying code sent by the smart household appliance, the terminal determines that the pairing and connecting is successful; the terminal scans a two-dimensional code carried by the smart household appliance itself for pairing and connecting. NFC (Near Field Communication) pairing and connecting, namely, after the terminal is approximate to an NFC module of the smart household appliance, the smart household appliance and the terminal send their own information to each other, so as to exchange information and fulfill pairing and connecting. After the terminal and smart household appliance is paired and connected successfully, the terminal acquires information of the smart household appliance, such as a model, a manufacturer, a state of the smart household appliance and parameters setting of the current state of the smart household appliance, etc. The terminal stores the acquired information of the smart household appliance, and if the terminal needs to control the smart household appliance once again, the terminal can quickly be paired and connected with the smart household appliance according to the information of the smart household appliance used in paring and connecting for the first time.

In an embodiment, opening the first-level control interfaces of multiple smart household appliances through the terminal comprising: opening the first-level control interfaces of multiple smart household appliances; determining the smart household appliance finally displayed through the terminal during controlling the smart household appliance last time; displaying the first-level control interface of the finally displayed smart household appliance on the screen of the terminal, so that the opened first-level control interfaces of the multiple smart household appliances in the power-on state can be toggled by the user and displayed on the screen of the terminal.

In an embodiment, if it is determined that all of the smart household appliances are in the power-off state, then the terminal opens the first-level control interfaces of the smart household appliances, and the first-level control interface of the smart household appliance finally displayed through the terminal during controlling the smart household appliance last time, is displayed on the screen of terminal.

In an embodiment, if it is determined that all of the smart household appliances are in the power-off state, the step of opening the first-level control interfaces of multiple smart household appliances can be skipped, and directly determine the first-level control interface of the smart household appliance to be displayed preferentially, thereby reducing the page jumping process, increasing the reaction speed of the appliance, and reducing user's error operations.

Figure 5A:
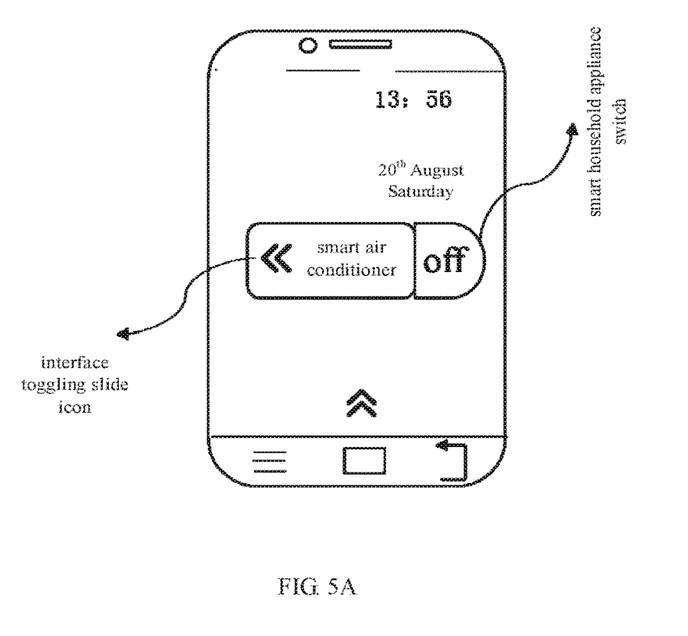
FIG. 5A is a view illustrating a terminal-based first-level control interface of a smart air conditioner provided by an embodiment of the present disclosure.
Figure 5B:
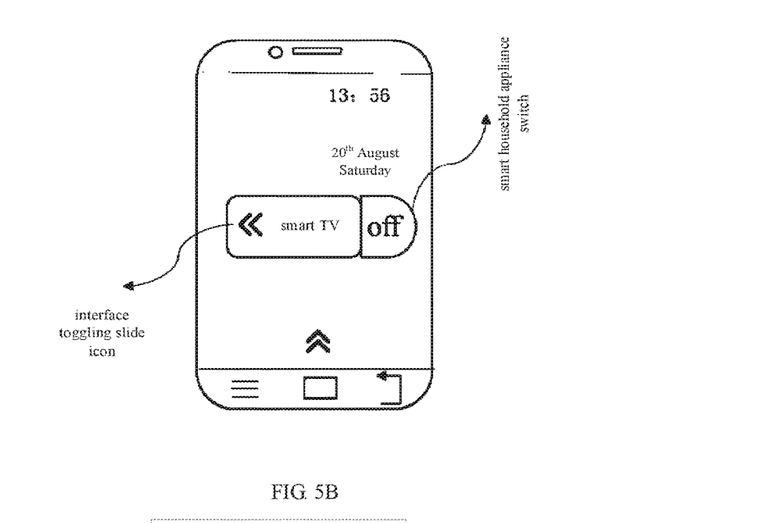
FIG. 5B is a view illustrating a terminal-based first-level control interface of a smart television provided by an embodiment of the present disclosure.

For example, the smart household appliances include a smart television and a smart air conditioner. If the smart television and the smart air conditioner are currently in the power-off state, then the terminal opens the first-level control interfaces of the smart television and the smart air conditioner; if the terminal determines that the last control operation of the smart household appliance prior to the current control operation of the smart household appliance is exited from the smart television, then the first-level control interface of the smart television is displayed on the screen of the terminal, so that the first-level control interface of the smart air conditioner to be toggled by the user and displayed on the screen of the terminal. In an embodiment, FIG. 5A illustrates the terminal-based first-level control interface of the terminal-based smart air conditioner provided by an embodiment of the present disclosure. As shown in FIG. 5A, the first-level control interface of the smart air conditioner is configured with a smart household appliance name (smart air conditioner), an interface toggling slide icon option, a smart air conditioner turning on option, an upward and downward sliding option, etc. By sliding the interface toggling slide icon option on the first-level control interface of the smart air conditioner, the first-level control interface of the smart television can be toggled on the screen of the terminal. The working parameters of the smart air conditioner can be adjusted through the second-level control interface of the smart air condition, which is opened by the smart air conditioner turning on option. Alternatively, FIG. 5B illustrates the terminal-based first-level control interface of the smart television provided by an embodiment of the present disclosure. As shown in FIG. 5B, the first-level control interface of the smart television is configured with a smart household appliance name (smart television), an interface toggling slide icon option, smart television turning on option, upward and downward sliding option, etc. By sliding the interface toggling slide icon option on the first-level control interface of the smart television, the first-level control interface of the smart air conditioner can be toggled on the screen of the terminal. The working parameters of the smart television can be adjusted through the second-level control interface of the smart television, which is opened by the smart television turning on option.

In an embodiment, opening the second-level control interface of at least one smart household appliance in the power-on state through the terminal comprises: opening the second-level control interface of at least one smart household appliance in the power-on state through the terminal which is in a screen-locked state. Opening the first-level control interfaces of multiple smart household appliances through the terminal comprises: opening the first-level control interfaces of multiple smart household appliances through the terminal which is in a screen-locked state. In this way, the control interfaces of the smart household appliances can be displayed in the screen-locked state, thereby reducing user's operations of unlocking and selecting control interfaces to be displayed, reducing steps of manual operation, and improving efficiency. Moreover, the display in the screen-locked state also makes it convenient for the user to know the working state of the smart household appliance at any time, thereby improving the controllability of the smart household appliance.

In an embodiment, opening the first-level control interface or the second-level control interface of the smart household appliance through the terminal is executed when the terminal is in the screen-locked state. In an embodiment, light the screen of the terminal, and display the first-level control interface or the second-level control interface of the smart household appliance, which was finally displayed through the terminal during controlling the smart household appliance last time, is displayed on the screen of the terminal; if the first-level control interface of the smart household appliance is displayed on the screen of the terminal, open the second-level control interface of the smart household appliance through operating the first-level control interface, and adjust the working parameters of the smart household appliance through the second-level control interface; if the second-level control interface of the smart household appliance is displayed on the screen of the terminal, then adjust the working parameters of the smart household appliance through the second-level control interface of the smart household appliance. That is to say, when the terminal is in the screen-lock state, the working parameters of the corresponding smart household appliance can be adjusted only through opening the second-level control interface of the smart household appliance, and the smart household appliance can be controlled after lighting the screen of the terminal, without unlocking the terminal, thereby further improving the convenience of controlling the smart household appliance.

Figure 6:
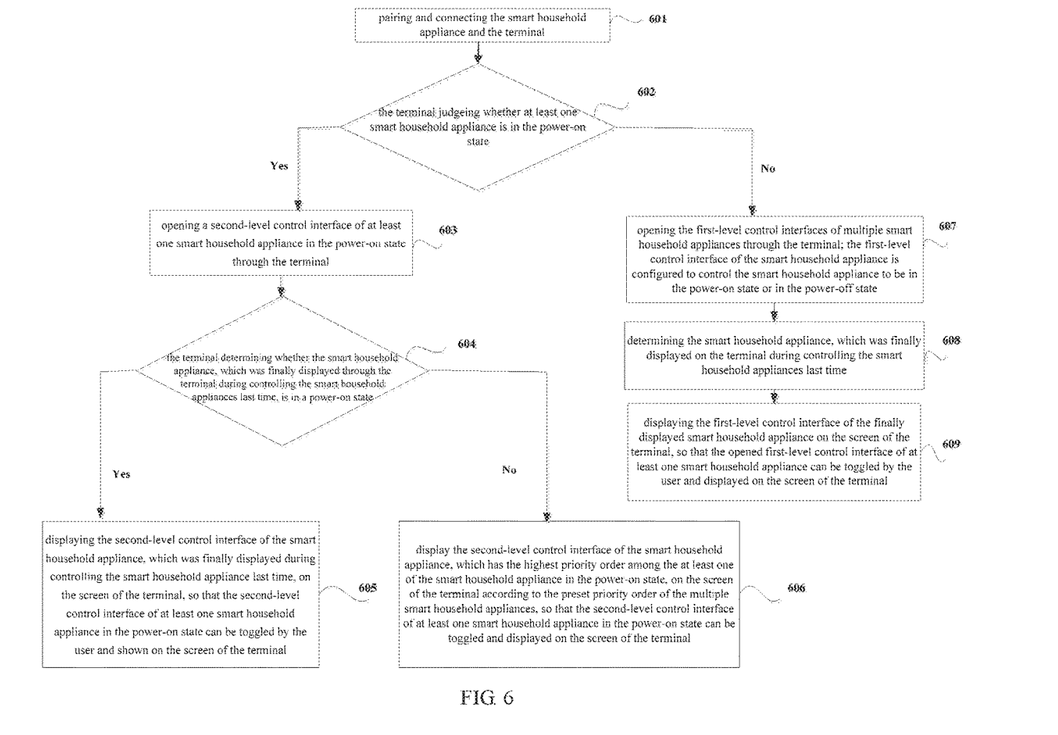
FIG. 6 is a flow chart illustrating a terminal-based control method for a smart household appliance provided by another embodiment of the present disclosure.

In order to introduce the flow of the above method more clearly, FIG. 6 illustrates another terminal-based control method for a smart household appliance provided by an embodiment of the present disclosure. As shown in FIG. 6, the method includes following steps.

Step 601, pair and connect the smart household appliance and the terminal.

In an embodiment, prior to determining the state of the smart household appliance, the terminal and the smart household appliance need to be paired and connected for the first time, which includes but is not limited to the following ways: pairing and connecting through Bluetooth. The terminal and the smart household appliance are simultaneously connected to the same Wi-Fi network, then the terminal searches the smart household appliance connected to the same Wi-Fi network; after searching the smart household appliance connected to the same Wi-Fi network, the terminal sends a pairing and connecting request to the smart household appliance to be controlled; after receiving the pairing and connecting request sent by the terminal, the smart household appliance sends an identifying code of pairing and connecting to the terminal; after the terminal receives the identifying code sent by the smart household appliance, the terminal determines that the pairing and connecting is successful; the terminal scans a two-dimensional code carried by the smart household appliance itself for pairing and connecting. NFC (Near Field Communication) pairing and connecting, namely, after the terminal is approximate to an NFC module of the smart household appliance, the smart household appliance and the terminal send their own information to each other, so as to exchange information and fulfill pairing and connecting. After the terminal and smart household appliance is paired and connected successfully, the terminal acquires information of the smart household appliance, such as a model, a manufacturer, a state of the smart household appliance and parameters setting of the current state of the smart household appliance, etc. The terminal stores the acquired information of the smart household appliance, and if the terminal needs to control the smart household appliance once again, the terminal can quickly be paired and connected with the smart household appliance according to the information of the smart household appliance used in paring and connecting for the first time.

Step 602, the terminal judges whether at least one smart household appliance is in the power-on state; if so, perform step 603; if all of the smart household appliances are in the power-off state, then perform step 607.

Step 603, open a second-level control interface of at least one smart household appliance in the power-on state through the terminal, wherein, the second-level control interface of the smart household appliance is configured to adjust the working parameters of the smart household appliance.

Step 604, the terminal determines whether the smart household appliance, which was finally displayed through the terminal during controlling the smart household appliances last time, is in a power-on state or not; if yes, perform step 605; if not, perform step 606.

Step 605, display the second-level control interface of the smart household appliance, which was finally displayed during controlling the smart household appliance last time, on the screen of the terminal, so that the opened second-level control interface of at least one smart household appliance in the power-on state can be toggled by the user and shown on the screen of the terminal.

In an embodiment, if it is determined that only one smart household appliance is in the power-on state, then the second-level control interface of the smart household appliance in the power-on state is displayed on the screen of the terminal.

Step 606, display the second-level control interface of the smart household appliance, which has the highest priority order among the at least one of the smart household appliance in the power-on state, on the screen of the terminal according to the preset priority order of the multiple smart household appliances, so that the opened second-level control interface of at least one smart household appliance in the power-on state can be toggled by the user and displayed on the screen of the terminal.

Step 607, open the first-level control interfaces of multiple smart household appliances through the terminal; wherein, the first-level control interface of the smart household appliance is configured to control the smart household appliance to be in the power-on state or in the power-off state.

Step 608: determine the smart household appliance, which was finally displayed on the terminal during controlling the smart household appliances last time.

Step 609: display the first-level control interface of the finally displayed smart household appliance on the screen of the terminal, so that the opened first-level control interface of at least one smart household appliance can be toggled by the user and displayed on the screen of the terminal.

It should be noted that, in the above method, the first-level control interface or the second-level control interface of the smart household appliance can be opened on the terminal when the terminal is in the screen-locked state, and the user can control the smart household appliance after lighting the screen of the terminal, without unlocking the terminal, thereby further improving the convenience of controlling the smart household appliance.

It can be seen from the description above, in the embodiments of the present disclosure, the terminal needs to first determine whether each smart household appliance is in the power-on state or the power-off state. If at least one smart household appliance is in the power-on state, open the second-level control interface of at least one of the smart household appliance in the power-on state through the terminal, and directly adjust the working parameters of the smart household appliance through the second-level control interface, thereby realizing the convenience of controlling the smart household appliance; further, the user can control the smart household appliance after lighting the screen of the terminal, without unlocking the terminal, thereby further improving the convenience of controlling the smart household appliance.

In an embodiment, the steps 603 and 607 of the embodiment shown in FIG. 6 may be skipped, thereby reducing the interface jumping on the terminal, increasing the reaction speed of the appliance, and reducing user's error operations.

Figure 7:
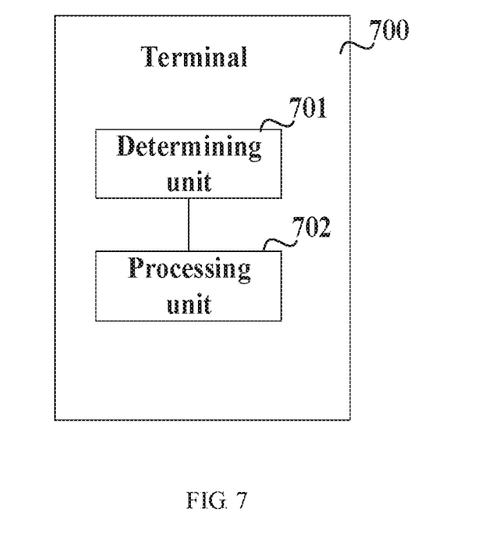
FIG. 7 is a schematic structural diagram of a terminal for controlling a smart household appliance provided by a first embodiment of the present disclosure.

FIG. 7 is a schematic structural diagram illustrating a terminal for controlling a smart household appliance provided by an embodiment of the present disclosure.

Based on the same concept, the embodiment of the present disclosure provides a terminal for controlling a smart household appliance. As shown in FIG. 7, the terminal 700 includes a determining unit 701 and a processing unit 702. Wherein, the determining unit 701 is configured to determine a working state of each of the multiple smart household appliances, and the working state may be a power-on state or a power-off state. The processing unit 702 is configured to, when it is determined that at least one of the multiple smart household appliances is in the power-on state, open a second-level control interface of at least one smart household appliance in the power-on state; wherein, the second-level control interface of the smart household appliance is configured to adjust the working parameters of the smart household appliance.

In this embodiment, the terminal can determine whether each smart household appliance is in the power-on state or the power-off state. If at least one smart household appliance is in the power-on state, then open the second-level control interface of at least one smart household appliance in the power-on state through the terminal, and the working parameters of the smart household appliance can be directly adjusted through the second-level control interface, thereby reducing the manual selection of the user and improving the convenience of controlling the smart household appliance.

In an embodiment, when it is determined that multiple smart household appliances are in the power-on state, the processing unit opens the second-level control interface of at least one smart household appliance in the power-on state; if it is determined that the last displayed smart household appliance is in the power-on state, then the second-level control interface of the last displayed smart household appliance is displayed on the screen, so that the opened second-level control interface of at least one smart household appliance can be toggled by the user and shown on the screen. The determining unit is capable of determining the smart household appliance last displayed during controlling the smart household appliances last time. As the probability that the finally displayed smart household appliance continues to be operated is relative high, preferentially displaying the finally displayed smart household appliance can increase the hit rate for the smart household appliance that the user will operate next time, thereby improving the intelligent degree and user experience.

In an embodiment, when the processing unit determines that multiple smart household appliances are in the power-on state, the processing unit may skip the step of opening the second-level control interface of at least one smart household appliance in the power-on state, and directly performs the step of determining the second-level control interface of the smart household appliance to be displayed, thereby reducing the page jumping process, improving the reaction speed of the device, and also reducing user's error operations.

In an embodiment, the processing unit is further configured to, when it is determined that the last displayed smart household appliance is in the power-off state, display the second-level control interface of the smart household appliance, which has the highest priority order among at least one smart household appliance in the power-on state, on the screen according to the preset priority order of the multiple smart household appliances, so that the opened second-level control interface of at least one smart household appliance in the power-on state can be toggled by the user and displayed on the screen. In this way, the terminal can display the second-level control interfaces of the smart household appliances in accordance with the priority order, which enables the display sequence of the second-level control interfaces to meet the usual requirements of the user, thereby reducing toggling operation of the user and improving user experience.

In an embodiment, the processing unit is further configured to, when it is determined that all smart household appliances are in the power-off state, open a first-level control interface of one smart household appliance or first-level control interfaces of multiple smart household appliances; wherein, the first-level control interface of the smart household appliance is configured to control the smart household appliance to be in the power-on state or in the power-off state.

In an embodiment, the processing unit is configured to open the first-level control interfaces of the multiple smart household appliances, and to display the first-level control interface of the last displayed smart household appliance on the screen, so that the first-level control interfaces of the multiple smart household appliances can be toggled by the user and displayed on the screen. The determining unit can determine the smart household appliance last displayed during controlling the smart household appliances last time. As the probability that the finally displayed smart household appliance continues to be operated is relative high, preferentially displaying the finally displayed smart household appliance can increase the hit rate for the smart household appliance that the user will operate next time, thereby improving the intelligent degree and user experience.

In an embodiment, when it is determined that all of the smart household appliances are in the power-off state, the processing unit skips the step of opening the first-level control interfaces of multiple smart household appliances, and directly determines the first-level control interface of the smart household appliance to be displayed, thereby reducing the page jumping process, increasing the reaction speed of the appliance, and reducing user's error operations.

In an embodiment, the processing unit is configured to open the second-level control interface of at least one smart household appliance in the power-on state through the terminal which is in the screen-locked state, and to open the first-level control interfaces of the multiple smart household appliances through the terminal which is in the screen-locked state. Thus the terminal can realize the display of controlling the smart household appliance after the screen of the terminal is lightened, without unlocking, thereby improving the convenience of controlling the smart household appliance.

Figure 8:
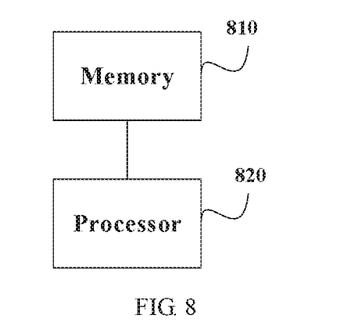
FIG. 8 is a schematic structural diagram of a terminal for controlling a smart household appliance provided by a second embodiment of the present disclosure.

FIG. 8 is a schematic structural view of a terminal for controlling the smart household appliance according to another embodiment of the present invention. As shown in FIG. 8, the terminal for controlling the smart household appliance includes a memory 810 and a processor 820. Wherein, the memory 810 can be a magnetic disk, a flash memory, or any other non-volatile storage medium. The memory is configured to store instructions of the corresponding embodiment of the terminal-based control method for a smart household appliance. The processor 820 is coupled and connected to the memory 810, and can be implemented as one or more integrated circuits, such as a microprocessor or a microcontroller. The processor 820 is configured to perform the instructions stored in the memory, thereby improving the convenience of controlling the smart household appliance.

Figure 9:
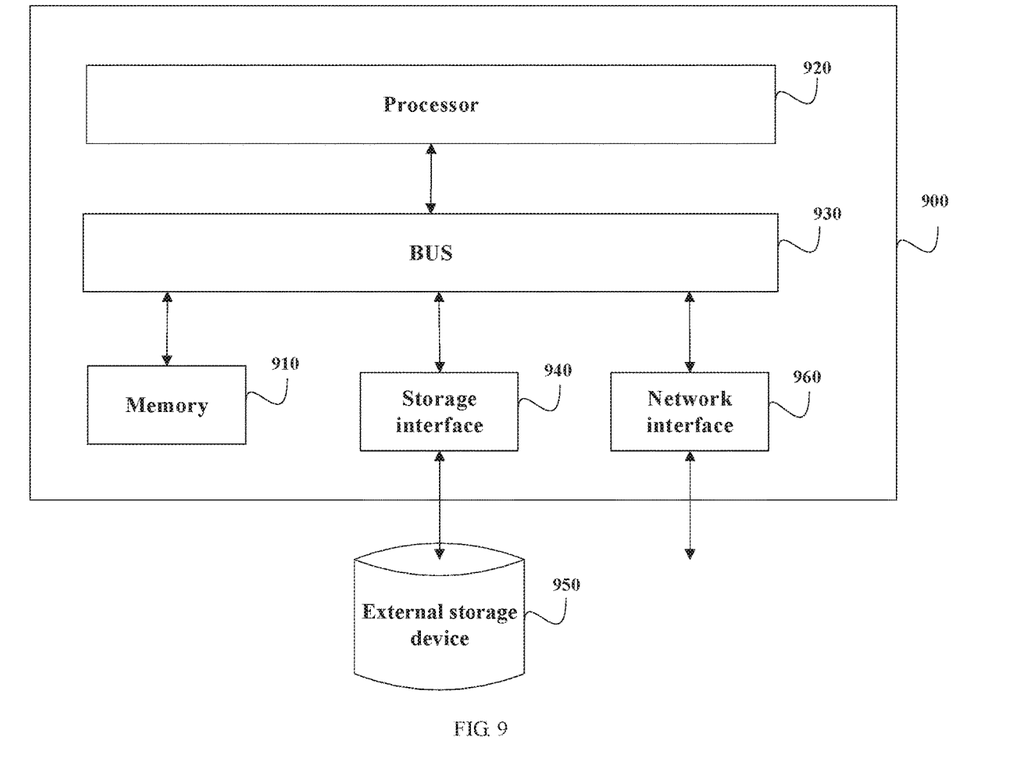
FIG. 9 is a schematic structural diagram of a terminal for controlling a smart household appliance provided by a third embodiment of the present disclosure.

In an embodiment, as shown in FIG. 9, the terminal 900 for controlling the smart household appliance includes a memory 910 and a processor 920. The processor 920 is coupled to the memory 910 via the bus 930. The terminal 900 for controlling the smart household appliance can also be connected to an external storage device 950 through a storage interface 940, so as to call external data. The terminal 900 can also be connected to a network or another computer system (not shown) through the network interface 960. The execution process, specific information and instructions transmissions will not be described in detail herein.

In this embodiment, the data and instructions are stored in the memory, and the processor processes the above instructions, thereby realizing and improving the convenience of controlling the smart household appliance.

In another embodiment, a computer readable storage medium is provided, in which the computer program instructions are stored; and when the instructions are executed by a processor, steps of a method in accordance with the terminal-based control method for a smart household appliance are executed. It should be understood that, for those skilled in the art, the embodiments of the present invention can be provided as a method, a device or products of computer programs. Therefore, the present invention can use the forms of entirely hardware embodiment, entirely software embodiment, or embodiment combining software and hardware. Moreover, the present invention can use the form of the product of computer programs, comprising programming codes and to be executed on one or multiple non-transitory computer-readable storage media (including but not limit to disk memory, CD-ROM, optical memory etc.).

This present invention is described with reference to the method, device (system) and the flow charts and/or block diagrams of computer program products according to the embodiments of the present invention. It should be understood that each flow and/or block in the flow chart and/or block diagrams as well as the combination of the flow and/or block in the flow chart and/or block diagram can be achieved through computer program instructions. Such computer program instructions can be provided to general computers, special-purpose computers, embedded processors or any other processors of programmable data processing equipment so as to generate a machine, so that a device for realizing one or multiple flows in the flow diagram and/or the functions specified in one block or multiple blocks of the block diagram is generated by the instructions to be executed by computers or any other processors of the programmable data processing equipment.

Such computer program instructions can also be stored in readable memory of computers which can lead computers or other programmable data processing equipment to working in a specific style so that the instructions stored in the readable memory of computers generate the product including command device; such a command device can achieve one or multiple flows in the flow chart and/or the functions specified in one or multiple blocks of the block diagram.

Such computer program instructions can also be loaded on computers or other programmable data processing equipment, so as to carry out a series of operation steps on computers or other programmable equipment to generate the process to be achieved by computers, so that the instructions to be executed by computers or other programmable equipment achieve the one or multiple flows in the flow chart and/or the functions specified in one block or multiple blocks of the block diagram.

So far, the present invention has been described in detail. In order to avoid obscuring the concepts of the present invention, some details known in the art are not described. Those skilled in the art can fully understand how to implement the technical solutions disclosed herein according to the above description.

The method and the device of the present invention may be implemented in a number of manners. For example, the method and the device of the present invention can be implemented through software, hardware, firmware, or any combination of software, hardware and firmware. The order of the steps of the method is for illustrative purposes only, and the steps of the method of the present invention are not limited to the order specifically described above unless other specific illustrations are stated. Moreover, in some embodiments, the invention may also be implemented as programs recorded in a recording medium, and such programs comprising machine readable instructions for implementing the method of the present invention. Thus, the present invention also covers the recording medium storing programs for performing the method of the present invention.

Finally, it should be noted that the above embodiments are only used to illustrate the technical schemes of the present invention, but not intended to limit the scope of the present invention. Although the present invention are described in detail refer to the preferred embodiments, it should be understood by those skilled in the art that various modifications or equivalent substitutions for partial technical features can be made without departing from the spirits of the present invention, and all these various modifications or equivalent substitutions are within the scope of the present disclosure.

What is claimed is:

1. A terminal-based control method for a smart household appliance, comprising:
    determining a working state of each smart household appliance by a terminal; and
    opening a first control window of at least one smart household appliance which is in a power-on state through the terminal in a screen-locked state when it is determined that at least one multiple smart household appliance is in a power-on state; wherein, the first control window is configured to adjust working parameters of the smart household appliance.

2. The method according to claim 1, wherein, opening the first control window of at least one smart household appliance which is in the power-on state through the terminal in the screen-locked state comprises:
    determining a latest smart household appliance displayed through the terminal during controlling the smart household appliances when it is determined that multiple smart household appliances are in the power-on state; and
    displaying a first control window of the latest smart household appliance on the terminal preferentially when the latest smart household appliance is in the power-on state.

3. The method according to claim 2, further comprising:
    determining the smart household appliance in the power-on state to be displayed, according to a preset priority order of multiple smart household appliances when it is determined that multiple smart household appliances are in the power-on state and that the latest smart household appliance is in a power-off state.

4. The method according to claim 2, further comprising:
    toggling and displaying first control windows of the multiple smart household appliances in the power-on state on a screen of the terminal according to a user's operation.

5. The method according to claim 1, further comprising:
    opening a second control window of at least one smart household appliance through the terminal in a screen-locked state when it is determined that all smart household appliances are in a power-off state; wherein, the second control window is configured to control the working state of the smart household appliance.

6. The method according to claim 5, wherein, opening the second control window of at least one smart household appliance through the terminal in the screen-locked state comprises:
    determining a latest smart household appliance displayed through the terminal during controlling the smart household appliances; and
    displaying the second control window of the latest smart household appliance preferentially.

7. The method according to claim 5, wherein, second control windows of multiple smart household appliances in the power-off state are toggled and displayed on a screen of the terminal according to a user's operation.

8. The method according to claim 1, wherein, in a screen-locked state, the terminal displays the first control window.

9. The method according to claim 5, wherein, in a screen-locked state, the terminal displays the second control window.

10. A terminal for controlling a smart household appliance, comprising a memory; and
   a processor, wherein the processor is coupled and connected to the memory, and configured to:
   determine a working state of each smart household appliance; and
   open a first control window of at least one smart household appliance which is in a power-on state through a terminal in a screen-locked state when it is determined that at least one multiple smart household appliance is in a power-on state; wherein, the first control window is configured to adjust working parameters of the smart household appliance.

11. The terminal according to claim 10, wherein, the processor is further configured to:
   determine a latest smart household appliance displayed through the terminal during controlling the smart household appliances when it is determined that multiple smart household appliances are in the power-on state; and
   display a first control window of the latest smart household appliance on the terminal preferentially when the latest smart household appliance is in the power-on state.

12. The terminal according to claim 11, wherein, the processing unit is further configured to determine the smart household appliance in the power-on state to be displayed, according to a preset priority order of multiple smart household appliances when it is determined that multiple smart household appliances are in the power-on state, and that the latest smart household appliance is in a power-off state.

13. The terminal according to claim 11, wherein, the processing unit is further configured to toggle and display first control window of the multiple smart household appliances in the power-on state on a screen of the terminal according to a user's operation.

14. The terminal according to claim 10, wherein, the processing unit is further configured to open a second control window of at least one smart household appliance through the terminal if it is determined that all smart household appliances are in a power-off state; wherein, the second control window is configured to control the working state of the smart household appliance.

15. The terminal according to claim 14, wherein, the processing unit is further configured to:
   determine a latest smart household appliance displayed through the terminal during controlling the smart household appliances; and
   display the second control window of the latest smart household appliance preferentially.

16. The terminal according to claim 14, wherein, the processing unit is further configured to toggle and display the second control windows of multiple smart household appliances in the power-off state on a screen of the terminal according to a user's operation.

17. The terminal according to claim 10, wherein, in a screen-locked state, the terminal displays the first control window.

18. The terminal according to claim 14, wherein, in a screen-locked state, the terminal displays the second control window.

19. A computer readable storage medium, wherein, computer program instructions are stored in the computer readable storage medium; and when the instructions are executed by one or more processors, following steps are performed:
   determining a working state of each smart household appliance by a terminal; and
   opening a first control window of at least one smart household appliance which is in a power-on state through the terminal in a screen-locked state when it is determined that at least one multiple smart household appliance is in a power-on state; wherein, the first control window is configured to adjust working parameters of the smart household appliance.

20. The computer readable storage medium according to claim 19, wherein, opening the first control window of at least one smart household appliance which is in the power-on state through the terminal in the screen-locked state comprises:
   determining a latest smart household appliance displayed through the terminal during controlling the smart household appliances when it is determined that multiple smart household appliances are in the power-on state; and
   displaying a first control window of the latest smart household appliance on the terminal preferentially when the latest smart household appliance is in the power-on state.

* * * * *